United States Patent
Davies

(10) Patent No.: US 7,937,904 B2
(45) Date of Patent: May 10, 2011

(54) CORNER JOINT FOR PULTRUDED WINDOW FRAME

(76) Inventor: Laurence W. Davies, Winnipeg (CA)

( * ) Notice: Subject to any disclaimer, the term of this patent is extended or adjusted under 35 U.S.C. 154(b) by 712 days.

(21) Appl. No.: 11/558,534

(22) Filed: Nov. 10, 2006

(65) Prior Publication Data

US 2008/0060314 A1 Mar. 13, 2008

(30) Foreign Application Priority Data

Sep. 11, 2006 (CA) .................................... 2569225

(51) Int. Cl.
*E04C 2/38* (2006.01)
*B25G 3/00* (2006.01)
*B25G 3/28* (2006.01)
*F16B 7/02* (2006.01)
*F16B 2/14* (2006.01)

(52) U.S. Cl. ...................... 52/656.1; 52/656.2; 52/656.4; 52/656.5; 52/656.9; 403/231; 403/253; 403/263; 403/334; 403/358; 403/409.1

(58) Field of Classification Search ................. 52/656.9, 52/656.1, 656.2, 656.4, 656.5; 403/231, 403/253, 263, 334, 358, 409.1
See application file for complete search history.

(56) References Cited

U.S. PATENT DOCUMENTS

| | | | |
|---|---|---|---|
| 4,145,150 A | | 3/1979 | Rafeld |
| 4,240,765 A | * | 12/1980 | Offterdinger ................. 403/402 |
| 4,551,364 A | * | 11/1985 | Davies ........................... 428/34 |
| 4,651,482 A | | 3/1987 | Borys |
| 5,059,056 A | * | 10/1991 | Banthia et al. ............... 403/170 |
| 5,921,056 A | * | 7/1999 | Weiss et al. ................. 52/745.16 |
| 5,951,796 A | * | 9/1999 | Murray ........................... 156/78 |
| 6,276,111 B1 | * | 8/2001 | Pittman et al. ............... 52/741.1 |
| 6,746,175 B1 | * | 6/2004 | Gonnerman et al. ......... 403/403 |
| 2003/0026943 A1 | * | 2/2003 | Davies et al. ................. 428/113 |
| 2005/0193680 A1 | * | 9/2005 | Wang ........................... 52/656.9 |

FOREIGN PATENT DOCUMENTS

CA 2461802 1/2005

\* cited by examiner

*Primary Examiner* — Brian E Glessner
*Assistant Examiner* — Omar Hijaz
(74) *Attorney, Agent, or Firm* — Adrian D. Battison; Ade & Company Inc.

(57) ABSTRACT

A corner joint between two frame lineals of a pultruded window frame is defined by inserting a leg of a corner member into a hollow interior of each lineal and attaching the legs to the lineals by adhesive. Each leg has a plurality of surfaces thereof each having a first portion at the corner which lies closely adjacent a corresponding surface of the first lineal and a second portion, at the end of the first portion remote from the corner which tapers inwardly away from the corresponding surface of the first lineal such that a spacing therebetween increases in the direction away from the corner. The adhesive is applied to the tapered portion and the taper acts to force the adhesive along the leg to the first portion and to the ends of the lineals where the excess can be wiped away.

14 Claims, 2 Drawing Sheets

CORNER JOINT FOR PULTRUDED WINDOW FRAME

This invention relates to a method of forming a corner joint for a window or door frame which is particularly applicable to materials such as fiber reinforced resin which cannot be welded.

BACKGROUND OF THE INVENTION

One long standing problem with the manufacture of window or door frames from pultruded fiber reinforced resin materials has been the difficulty of forming corners which need to be mechanically fastened using corner inserts, in comparison with the major competitor of extruded vinyl where the corners can be quickly and inexpensively welded.

Typically corners for pultruded materials are formed using an injection molded corner member which has two legs one of which slides into each lineal at the corner and is fastened in place by screws inserted through the wall of the lineal into a screw receptacle in the corner member. This is a relatively slow and more expensive process which is perceived to be a significant disadvantage relative to vinyl.

It is known to provide a corner insert which is held in place by injecting a sealant along the legs of the corner insert which attach the insert to the lineal. However this injection is itself problematic so that the practice has not been adopted widely.

In Canadian Patent Application 2,461,802 published 10$^{th}$ Jan. 2005 by Pella Corporation is disclosed a method in which a sealant is injected through an opening into the areas of the legs of the corner member. Screws are used to hold the corner member in place while the sealant cures.

In U.S. Pat. No. 4,651,482 (Borys) issued Mar. 24$^{th}$ 1987 and U.S. Pat. No. 4,145,150 (Rafeld) issued Mar. 20$^{th}$ 1979 are disclosed a similar arrangement where legs of the corner member form cavities inside the lineals which are filled by an injected sealant.

SUMMARY OF THE INVENTION

It is one object of the invention to provide a method of forming a corner in a window or door frame.

According to one aspect of the invention there is provided a method of manufacturing a window or door frame comprising:

providing a first frame lineal formed from a fiber reinforced pultruded material and defining a constant transverse cross section extending longitudinally along the lineal, the transverse cross section having interior surfaces at least partly surrounding a hollow interior;

providing a second frame lineal formed from a fiber reinforced pultruded material and defining a constant transverse cross section extending longitudinally along the lineal, the transverse cross section having interior surfaces at least partly surrounding a hollow interior;

providing a corner member;

the corner member having a first leg portion for insertion into the hollow interior of the first lineal;

the corner member having a second leg portion for insertion into the hollow interior of the second lineal;

the leg portions being connected each to the other at the corner at an angle to hold the lineals in fixed connected position at the angle;

arranging the first leg portion to have a plurality of surfaces thereof each having a first portion at the corner which lies closely adjacent a corresponding surface of the first lineal and a second portion, at the end of the first portion remote from the corner, which second portion tapers inwardly away from the corresponding surface of the first lineal such that a spacing therebetween increases in the direction away from the corner;

arranging the second leg portion to have a plurality of surfaces thereof each having a first portion at the corner which lies closely adjacent a corresponding surface of the second lineal and a second portion, at the end of the first portion remote from the corner, which second portion tapers inwardly away from the corresponding surface of the second lineal such that a spacing therebetween increases in the direction away from the corner;

applying a layer of an adhesive onto at least the second portions of the leg portions of the corner member;

and inserting the leg portions into the respective lineals so as to squeeze the layer of adhesive onto the first portions and onto the ends of the lineals to provide a seal therebetween.

Where reference is made to the interior surfaces at least partly surrounding a hollow interior, this may be provided by an arrangement which has in effect four side walls closed around the hollow interior or may be provided by an arrangement in which one of the side walls is open. In terms of window frames, the cross section or profile is generally rectangular with four sides, one of which faces inwardly into the opening within the frame, one faces outwardly, one forms a front surface facing generally inwardly into the wall or building and one forms a rear surface facing outwardly of the wall or building. In many cases the inwardly facing surface is shaped to accommodate and carry the glazing unit. The frame may be rectangular with four 90 degree corners but other polygonal shapes can be formed with corners at different angles.

Preferably sufficient adhesive is applied to squeeze out over the exterior surfaces of the frame lineals and the method includes including removing excess adhesive from exterior surfaces of the lineals.

In many cases each of the first and second lineals is mitred at the corner to form a mitre joint. However the method can also be used with butt joints between dissimilar profiles which cannot be mitered together.

Preferably each surface of the first leg portion has a corresponding surface of the first lineal and each surface of the first leg portion has the first portion thereof closely adjacent the corresponding surface such that the first leg portion is shaped to closely match the interior cross section of the first lineal. Thus the joint is formed by matching surfaces fully surrounding the leg. However the joint can be formed where at least one of the surfaces are not so cooperating and connected.

Preferably the first portion of each surface of the first leg portion is shaped so that it has a substantially constant spacing from the corresponding surface of the first lineal from the corner up to the tapered second portion. However a light taper may be provided so that the spacing is not constant. The best adhesive effect is of course obtained where the spacing is constant and selected to provide a sufficient narrow gap that the adhesive can work as a film with little or no shearing forces.

Preferably the spacing between the first portion of the surfaces of the first leg and the corresponding surfaces of the first lineal lies in the range 0.001 inch to 0.020 inch. For ease of manufacturing and selection of tolerances, a spacing of the order of 0.010 inch has been found suitable.

Preferably the spacing between the first portion of the surfaces of the first leg and the corresponding surfaces of the first lineal is less than 0.050 inch. In practice the tapered section has a spacing which can increase from the initial value of the order of 0.010 inch up to 0.020 inch.

Preferably the adhesive is a fast curing adhesive.

Preferably the adhesive has a cure time of less than 5 minutes to a state where the lineals can be released from support. In many cases a cure time of the order of 1 minute is suitable to allow the proper application of the adhesive and the connection of the parts while avoiding excessive hold times. A suitable adhesive which provides the above cure times and suitable adhesive bond is manufactured by 3M under the trade mark "Scotch-Weld" Polyurethane Reactive Easy Adhesive.

In many cases the lineals are attached to the corner member solely by the adhesive with no additional mechanical fasteners. This can be achieved where clamping arrangement are available to hold the members in place till curing has occurred. In arrangements where clamps are not available or not commercially suitable in view of low production runs, screws can be used as a temporary holding system. In this case the screws are likely not to be removed as this requires and additional steps but it is intended that the forces for the corner construction are provided by the adhesive with any remaining screws making little additional effect.

According to a second aspect of the invention there is provided a window or door frame comprising:

a first frame lineal formed from a fiber reinforced pultruded material and defining a constant transverse cross section extending longitudinally along the lineal, the transverse cross section having interior surfaces at least partly surrounding a hollow interior;

a second frame lineal formed from a fiber reinforced pultruded material and defining a constant transverse cross section extending longitudinally along the lineal, the transverse cross section having interior surfaces at least partly surrounding a hollow interior;

a corner member;

the corner member having a first leg portion for insertion into the hollow interior of the first lineal;

the corner member having a second leg portion for insertion into the hollow interior of the second lineal;

the leg portions being connected each to the other at the corner at an angle to hold the lineals in fixed connected position at the angle;

the first leg portion having a plurality of surfaces thereof each arranged to have a first portion at the corner which lies closely adjacent a corresponding surface of the first lineal and a second portion, at the end of the first portion remote from the corner, which second portion tapers inwardly away from the corresponding surface of the first lineal such that a spacing therebetween increases in the direction away from the corner;

the second leg portion having a plurality of surfaces thereof each arranged to have a first portion at the corner which lies closely adjacent a corresponding surface of the second lineal and a second portion, at the end of the first portion remote from the corner, which second portion tapers inwardly away from the corresponding surface of the second lineal such that a spacing therebetween increases in the direction away from the corner;

and a layer of an adhesive connecting the corner member to the first and second lineals;

the layer including a portion located between the surfaces of the first leg portion and the corresponding surfaces of the first lineal;

the layer including a portion located between the surfaces of the second leg portion and the corresponding surfaces of the second lineal;

and the layer including a portion between an end of the first lineal and an end of the second lineal to provide a seal therebetween.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
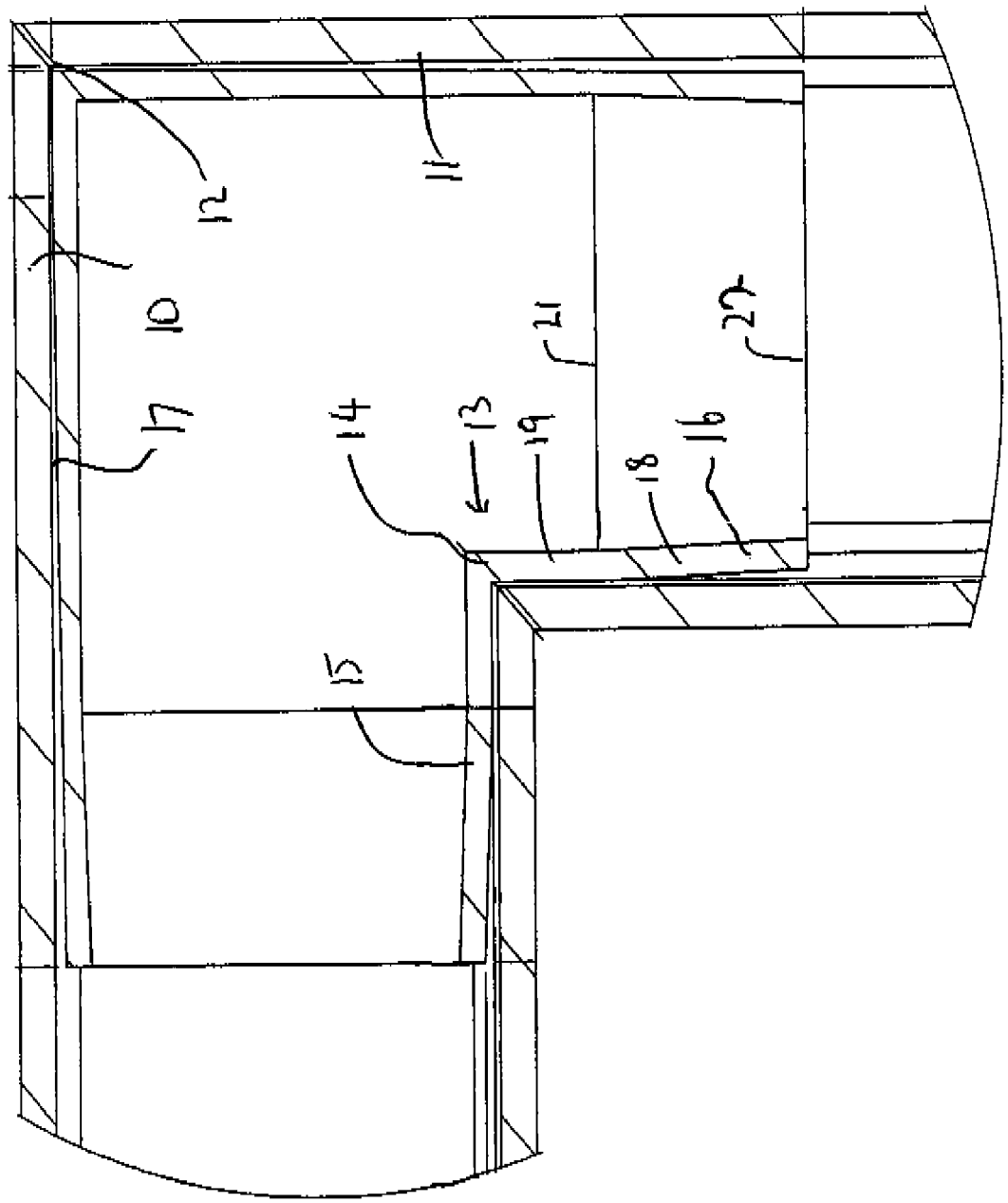
FIG. 1 is a cross sectional view through a corner between two lineals of a frame according to the present invention.

In FIG. 1 is shown a joint at a corner of a frame for a window or similar pultruded frame. The frame includes two frame lineals indicated at 10 and 11 respectively which connect together at a mitre joint 12.

The frame members 10 and 11 are formed by pultrusion by a fiber reinforced resin material so that they provide a constant cross section along the length of the frame members. The frame members are cut to length from a continuous pultruded lineal and can be connected at the corners by cutting the corners at an angle to provide a mitre joint or by connecting the corners at a butt joint. The corner as shown is at 90° so that the frame member 10 is at 90° to the frame member 11 but it is not essential that the corners be at right angles.

The corner connection is formed by providing a corner insert member generally indicated at 13. This corner insert member is formed as an injected moulded plastics part which defines an integral member defining a coupling portion 14 and two legs 15 and 16. The structure is hollow so as to provide the legs as tubular members defined by a peripheral wall as shown best in FIG. 2.

In the embodiment, the structure is of a simple nature where the frame members 10 and 11 are generally rectangular in cross section with no inverted sections and simply an external peripheral wall defining a hollow interior surface 17 of the frame members.

However, as is well known to a person skilled in the art, frame members of a more complex construction can be provided with an interior which is partly hollow or partly closed by transverse walls. It will be appreciated that the design of the corner member will vary depending upon the cross sectional shape of the interior surface of the frame member defined by the lineal.

The corner member thus provides an exterior surface 18 which is shaped so as to generally follow the interior surface 17 of the frame members.

In many cases all four walls or all of the walls of the frame member are arranged relative to the corner member 13 so that each surface of the corner member has a corresponding surface on the frame member. Thus in the embodiment shown there are basically four walls each having an interior surface closely adjacent to an exterior surface of the corner member. However the structure may be constructed with less than four walls or more than four walls as required. In some cases one of the walls of the frame member may be omitted so that the frame member does not form a closed hollow interior but is generally U-shaped with an open side. In this case the corner member will have three sides closely matching the three sides of the frame member and a fourth side at the open side of the frame member which can be merely constructed for structural strength without any necessity to closely follow the surface of the frame member.

The corner member 13 thus provides the two legs 15 and 16. Each of these two legs includes the outside surface 18 and this is divided into a first portion 19 and a second portion 20.

The first portion 19 extends from the corner connection 14 along the respective leg to an end transverse line 21 across the surface of the leg. From that line 21 to an end edge 22 of the leg the surface portion 18 is tapered as best shown in FIG. 1. Thus the portion 19 has a surface which is arranged so that it is closely adjacent the inside surface of the respective frame member. In order to provide a sliding fit of the leg within the frame member, there is a narrow spacing between the outside surface of the portion 19 and the inside surface of the frame member. This spacing is preferably of the order of 0.01 inch. The tapered portion 18 is arranged so that its outside surface increases in spacing from the inside surface of the leg from the line 21 to the edge 22. This taper thus provides a wedge-shape between the outside surface of the portion 18 and the inside surface of the frame member.

Figure 2:
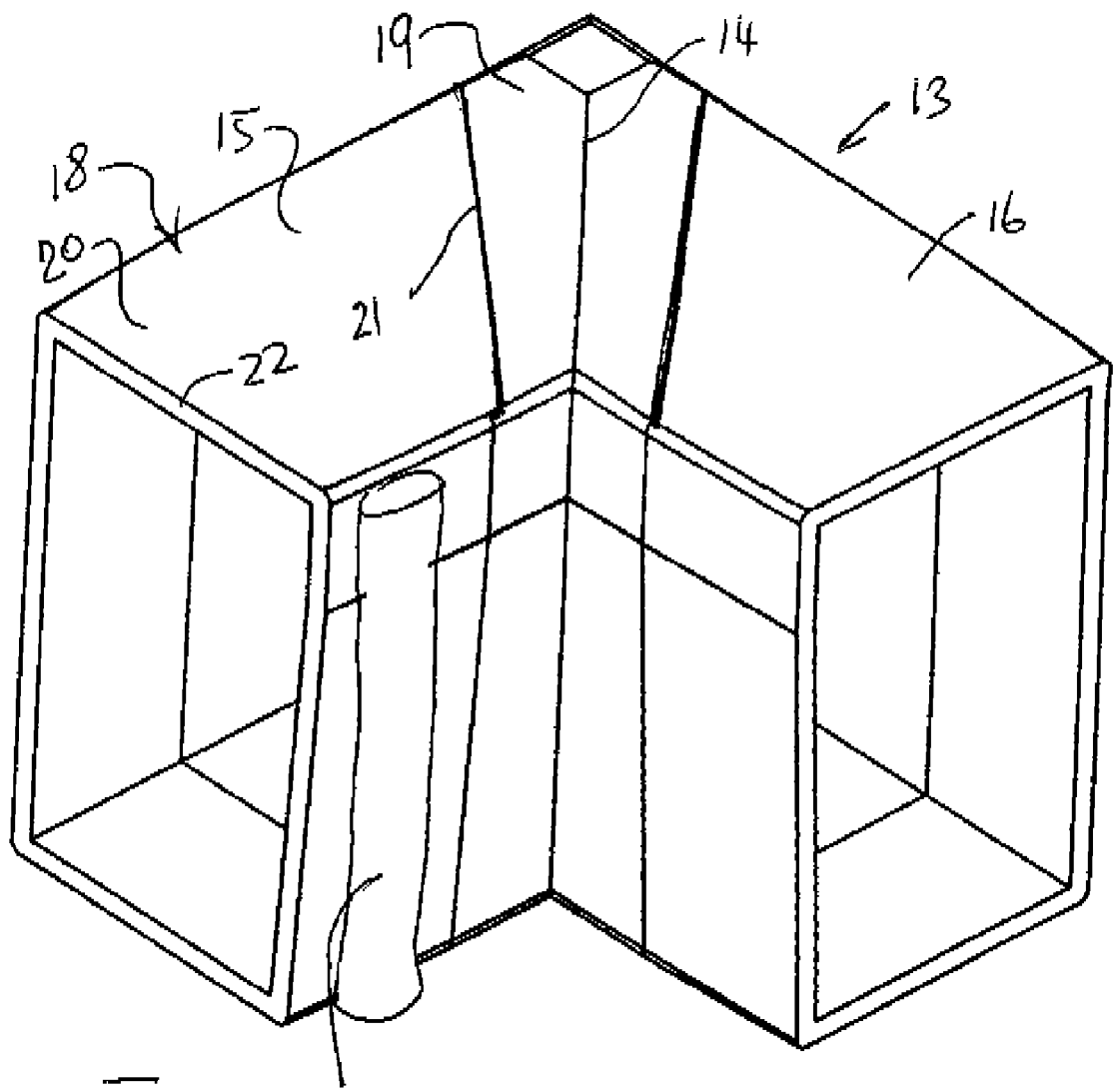
FIG. 2 is an isometric view of the corner member of FIG. 1.

As shown in FIG. 2, a bead of the adhesive as indicated at 30 is applied onto the surfaces of the leg of the corner member, The bead 30 is shown applied only onto one of the surfaces but it will be appreciated that the bead is applied around all of the surfaces of the leg of the corner member on the portion 18 of the leg. The bead can be applied at any position on the portion 18 but is preferably applied at the edge 22. The bead is applied preferably so that it is not applied onto the portion 19.

The application of the beads around the portion 18 allow the leg carrying the beads to be applied into the open end of the frame member and pushed into place. The taper of the portion 18 acts to squeeze gradually the material from the bead so that it is wiped over the surface of the portion 18 and onto the surface of the portion 19 to emerge at the joint 12.

The bead is preferably selected so that it has a height only slightly greater than the distance between the outside surface of the portion 18 and the inside surface of the frame member. The volume of the bead is selected so that it provides just enough adhesive material to sweep from the surface of portion 18 onto the surface of the portion 19 to the joint 12 and provide just enough material to emerge at the joint 12 without excessive material being carried onto these surfaces. This leaves a small amount of adhesive to be removed from the joint 12 when the legs have been fully inserted into the frame members.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of manufacturing a window or door frame comprising:
    providing a first frame lineal formed from a fiber reinforced pultruded material and defining a constant transverse cross section extending longitudinally, the transverse cross section having interior surfaces at least partly surrounding a hollow interior;
    providing a second frame lineal formed from a fiber reinforced pultruded material and defining a constant transverse cross section extending longitudinally, the transverse cross section having interior surfaces at least partly surrounding a hollow interior;
    providing a corner member;
    the corner member having a first leg portion for insertion into the hollow interior of the first frame lineal;
    the corner member having a second leg portion for insertion into the hollow interior of the second frame lineal;
    the first and second leg portions being connected each to the other at the corner at an angle to hold the first and second frame lineals in fixed connected position at the angle;
    arranging the first leg portion to have a plurality of surfaces thereof, each of which surfaces is arranged to lie closely adjacent a corresponding surface of the first frame lineal for adhesive attachment thereto;
    each surface of the first leg portion having a first portion at the corner which lies closely adjacent the corresponding surface of the first frame lineal and a second portion, at the end of the first portion remote from the corner, which second portion tapers inwardly away from the corresponding surface of the first frame lineal such that a spacing therebetween increases in the direction away from the corner;
    arranging the second leg portion to have a plurality of surfaces thereof, each of which surfaces is arranged to lie closely adjacent a corresponding surface of the second frame lineal for adhesive attachment thereto;
    each surface of the second leg portion having a first portion at the corner which lies closely adjacent the corresponding surface of the second frame lineal and a second portion, at the end of the first portion remote from the corner, which second portion tapers inwardly away from the corresponding surface of the second frame lineal such that a spacing therebetween increases in the direction away from the corner;
    applying a layer of an adhesive onto at least the second portions of the surfaces of the first and second leg portions of the corner member;
    and inserting the leg portions into the respective one of the first and second frame lineals so as to squeeze the layer of adhesive onto the first portions of the surfaces of the first and second leg portions and onto the ends of the frame lineals to provide a seal therebetween.

2. The method according to claim 1 including removing excess adhesive from exterior surfaces of the frame lineals.

3. The method according to claim 1 wherein each of the first and second frame lineals is mitered at the corner to form a miter joint.

4. The method according to claim 1 wherein the first portion of each surface of the first leg portion has a substantially constant spacing from the corresponding surface of the first frame lineal from the corner to the tapered second portion.

5. The method according to claim 1 wherein the spacing between the first portion of the surfaces of the first leg portion and the corresponding surfaces of the first frame lineal lies in the range 0.001 inch to 0.020 inch.

6. The method according to claim 1 wherein the spacing between the first portion of the surfaces of the first leg portion and the corresponding surfaces of the first frame lineal is less than 0.050 inch.

7. The method according to claim 1 wherein the adhesive is a fast curing adhesive.

8. The method according to claim 1 wherein the adhesive has a cure time of less than 5 minutes to a state where the first and second frame lineals can be released from support.

9. The method according to claim 1 wherein the first and second frame lineals are attached to the corner member solely by the adhesive with no additional mechanical fasteners.

10. A window or door frame comprising:
    a first frame lineal formed from a fiber reinforced pultruded material and defining a constant transverse cross section extending longitudinally, the transverse cross section having interior surfaces at least partly surrounding a hollow interior;

a second frame lineal formed from a fiber reinforced pultruded material and defining a constant transverse cross section extending longitudinally, the transverse cross section having interior surfaces at least partly surrounding a hollow interior;

a corner member;

the corner member having a first leg portion for insertion into the hollow interior of the first frame lineal;

the corner member having a second leg portion for insertion into the hollow interior of the second frame lineal;

the first and second leg portions being connected each to the other at the corner at an angle to hold the first and second frame lineals in fixed connected position at the angle;

the first leg portion having a plurality of surfaces thereof, each of which surfaces is arranged to lie closely adjacent a corresponding surface of the first frame lineal and adhesively attached thereto;

each surface of the first leg portion having a first portion at the corner which lies closely adjacent a corresponding surface of the first frame lineal and a second portion, at the end of the first portion remote from the corner, which second portion tapers inwardly away from the corresponding surface of the first frame lineal such that a spacing therebetween increases in the direction away from the corner;

the second leg portion having a plurality of surfaces thereof, each of which surfaces is arranged to lie closely adjacent a corresponding surface of the first frame lineal and adhesively attached thereto;

each surface of the first leg portion having a first portion at the corner which lies closely adjacent a corresponding surface of the second frame lineal and a second portion, at the end of the first portion remote from the corner, which second portion tapers inwardly away from the corresponding surface of the second frame lineal such that a spacing therebetween increases in the direction away from the corner;

and a layer of an adhesive connecting the corner member to the first and second frame lineals;

the layer including a portion located between the surfaces of the first leg portion and the corresponding surfaces of the first frame lineal;

the layer including a portion located between the surfaces of the second leg portion and the corresponding surfaces of the second frame lineal;

and the layer including a portion between an end of the first frame lineal and an end of the second frame lineal to provide a seal therebetween.

11. The frame according to claim 10 wherein each of the first and second frame lineals is mitered at the corner to form a miter joint.

12. The frame according to claim 10 wherein the first portion of each surface of the first leg portion has a substantially constant spacing from the corresponding surface of the first frame lineal from the corner to the tapered second portion.

13. The frame according to claim 10 wherein the spacing between the first portion of the surfaces of the first leg and the corresponding surfaces of the first frame lineal lies in the range 0.001 inch to 0.020 inch.

14. The frame according to claim 10 wherein the spacing between the first portion of the surfaces of the first leg and the corresponding surfaces of the first frame lineal is less than 0.050 inch.

\* \* \* \* \*